United States Patent
Guo

(10) Patent No.: US 11,345,832 B2
(45) Date of Patent: May 31, 2022

(54) PRESSURE SENSITIVE ADHESIVE COMPOSITIONS AND METHODS FOR PREPARING SAME

(71) Applicant: Synthomer USA LLC, Dover, DE (US)

(72) Inventor: Jong S. Guo, Charlotte, NC (US)

(73) Assignee: Synthomer USA LLC, Dover, DE (US)

( * ) Notice: Subject to any disclaimer, the term of this patent is extended or adjusted under 35 U.S.C. 154(b) by 0 days.

(21) Appl. No.: 15/749,864

(22) PCT Filed: Aug. 4, 2016

(86) PCT No.: PCT/EP2016/068633
§ 371 (c)(1),
(2) Date: Feb. 2, 2018

(87) PCT Pub. No.: WO2017/021487
PCT Pub. Date: Feb. 9, 2017

(65) Prior Publication Data
US 2018/0230340 A1    Aug. 16, 2018

Related U.S. Application Data

(60) Provisional application No. 62/201,353, filed on Aug. 5, 2015.

(51) Int. Cl.
| | | |
|---|---|---|
| *C09J 7/25* | (2018.01) | |
| *C09J 7/38* | (2018.01) | |
| *C09J 4/00* | (2006.01) | |
| *C09J 7/22* | (2018.01) | |
| *C09J 11/08* | (2006.01) | |
| *C09J 133/08* | (2006.01) | |
| *C09J 133/10* | (2006.01) | |
| C08F 220/18 | (2006.01) | |

(52) U.S. Cl.
CPC . *C09J 4/00* (2013.01); *C09J 7/22* (2018.01); *C09J 7/255* (2018.01); *C09J 7/38* (2018.01); *C09J 7/385* (2018.01); *C09J 11/08* (2013.01); *C09J 133/08* (2013.01); *C09J 133/10* (2013.01); C08F 220/1808 (2020.02); *C09J 2203/334* (2013.01); *C09J 2433/00* (2013.01); *C09J 2467/006* (2013.01)

(58) Field of Classification Search
CPC ... C09J 7/255; C09J 7/385; C09J 11/08; C09J 133/08; C09J 133/10; C09J 2203/334; C09J 2433/00; C09J 2467/006; B32B 7/12; C08F 2/22; C08F 2/38
See application file for complete search history.

(56) References Cited

U.S. PATENT DOCUMENTS

| | | | |
|---|---|---|---|
| 6,713,552 B1 * | 3/2004 | Lesko | C08F 4/00 524/549 |
| 7,737,208 B2 | 6/2010 | Kashihara | |
| 2002/0082319 A1 | 6/2002 | Zhao et al. | |
| 2007/0196455 A1 * | 8/2007 | Kamiyama | A61K 8/8158 424/448 |
| 2012/0261070 A1 * | 10/2012 | Gerst | C09J 4/00 156/331.6 |
| 2012/0263950 A1 | 10/2012 | Gerst et al. | |
| 2014/0142238 A1 * | 5/2014 | Guo | C09J 133/08 524/521 |
| 2016/0122597 A1 | 5/2016 | Xiao et al. | |

FOREIGN PATENT DOCUMENTS

| | | |
|---|---|---|
| JP | 200636920 A | 2/2006 |
| JP | 2011219616 A | 11/2011 |
| JP | 2015511976 A | 4/2015 |
| WO | 2013117428 A1 | 8/2013 |
| WO | 2014187692 A1 | 11/2014 |

* cited by examiner

*Primary Examiner* — Bijan Ahvazi
(74) *Attorney, Agent, or Firm* — The Webb Law Firm

(57) ABSTRACT

Disclosed pressure sensitive adhesive compositions, having enhanced heat resistance, obtained by the emulsion polymerization of (a) one or more acrylic acid ester or (meth) acrylate acid ester(s), (b) one or more hydroxyl functional (meth)acrylic monomer and (c) one or more ureido substituted (meth)acrylate monomers(s).

16 Claims, No Drawings

PRESSURE SENSITIVE ADHESIVE COMPOSITIONS AND METHODS FOR PREPARING SAME

CROSS-REFERENCE TO RELATED APPLICATIONS

This application is the United States national phase of International Application No. PCT/EP2016/068633 filed Aug. 4, 2016, and claims the benefit of U.S. Provisional Patent Application No. 62/201,353 filed Aug. 5, 2015, the disclosures of which are hereby incorporated in their entirety by reference.

FIELD OF THE INVENTION

The present invention relates to pressure sensitive adhesives (PSAs) having improved heat resistance. Specifically, the present invention relates to acrylic emulsion PSAs having enhanced heat resistance.

BACKGROUND OF THE INVENTION

Acrylic PSAs are utilized in many applications for bonding a flexible material to a surface, and are used, for example, in the tape and label industry, due to their high solids content, low volatile organic content, good ultra violet (UV)/thermal stability, and high coating speed. In some applications, in particular specialty tapes, where heat resistance is desirable, solvent and UV PSAs are typical used.

Acrylic PSAs are typically produced by emulsion or solution polymerization, with emulsion polymerization being preferred. The adhesion properties of acrylic emulsion PSAs are influenced by the type and relative amounts of the monomers employed in the polymerization process.

Accordingly, there is a need for acrylic emulsion PSAs having enhanced heat resistance that is comparable to solvent and UV PSA.

SUMMARY OF THE INVENTION

In one embodiment, there is provided a pressure sensitive adhesive composition which includes the emulsion polymerization product of a monomer mixture that contains: (a) one or more acrylic acid ester or (meth)acrylate acid ester(s); (b) one or more hydroxyl functional (meth)acrylic monomer; (c) one or more ureido substituted (meth)acrylate monomers(s); (d) optionally one or more hydrocarbon monomer(s); and (e) optionally one or more ethylenically unsaturated carboxylic acid(s).

In another embodiment, there is provided a pressure sensitive adhesive composition which includes the emulsion polymerization product of a monomer mixture that contains: (a) equal to or greater than about 50 wt % of the one or more acrylic acid ester or (meth)acrylate acid ester(s); (b) about 0.1 to about 5 wt % of the one or more hydroxyl functional (meth)acrylic monomer; (c) about 0.05 to about 3 wt % of the one or more ureido substituted (meth)acrylate monomers(s); (d) 0 to about 10 wt % or 0 to about 3 wt % of the optional one or more hydrocarbon monomer(s); and (e) 0 to about 6 wt % of the optional one or more ethylenically unsaturated carboxylic acid(s). Where the wt % is based on the total weight of the monomer mixture.

In another embodiment, there is provided a pressure sensitive adhesive composition which includes the emulsion polymerization product of a monomer mixture that contains: (a) the one or more acrylic acid esters or methacrylate acid esters which are $C_1$-$C_{17}$ alkyl acrylates or alkyl methacrylates; (b) the one or more hydroxyl functional (meth)acrylic monomer which are $C_1$-$C_{17}$ hydroxy functional alkyl acrylates or alkyl methacrylates, or which are more acrylic esters prepared from a glycidyl ester of $C_2$-$C_{12}$ carboxylic acid; and (c) one or more ureido substituted (meth)acrylate monomers which are $C_8$-$C_{17}$ ureido alkyl acrylates or alky methacrylates.

DETAILED DESCRIPTION OF THE INVENTION

The PSA compositions of the invention are obtained by the emulsion polymerization of (a) one or more acrylic acid ester or (meth)acrylate acid ester(s), (b) one or more hydroxyl functional (meth)acrylic monomer, (c) one or more ureido substituted (meth)acrylate monomers(s), (d) optionally one or more hydrocarbon monomer(s), and (e) optionally one or more ethylenically unsaturated carboxylic acid(s). It has been discovered that the combination of hydroxyl functional (meth)acrylic monomer(s) with ureido substituted (meth)acrylate monomer(s) produces emulsion PSAs with superior high temperature performance.

Examples of acrylic acid esters or methacrylate acid esters, Component (a), suitable for use in the present invention include $C_1$-$C_{17}$ alkyl acrylates or alkyl methacrylates. Typical examples include methyl acrylate, methyl methacrylate, ethyl acrylate, ethyl methacrylate, isopropyl acrylate, isopropyl methacrylate, n-butyl acrylate, n-butyl methacrylate, i-butyl acrylate, i-butyl methacrylate, t-butyl acrylate, t-butyl methacrylate, hexyl acrylate, hexyl methacrylate ethylhexyl acrylate, ethylhexyl methacrylate, 3,3 dimethylbutyl methacrylate, lauryl acrylate and any combination or subset thereof.

In one embodiment, Component (a) comprises one or more acrylic acid esters or (meth)acrylate acid esters whose homopolymer have a glass transition temperature ($T_g$) of less than or equal to $-20°$ C. In another embodiment, Component (a) comprises only one or more acrylic acid esters or (meth)acrylate acid esters whose homopolymer have a glass transition temperature ($T_g$) of less than or equal to $-10°$ C. or less than or equal to $-20°$ C. or lower.

The monomer mixture for the PSA composition of the invention may comprise equal to or greater than about 50 wt %, or about 50 to about 99 wt %, or about 50 to about 95 wt %, or about 60 to 95 wt %, or about 75 to about 95 wt %, or about 75 to 90 wt % acrylic acid esters or (meth)acrylate acid esters, based on the weight of Components (a)-(e). In another embodiment the monomer mixture for the PSA composition of the invention comprise greater than about 50 wt % or about 60 to 95 wt % or about 75 to about 95 wt % or about 75 to 90 wt % acrylic acid esters or (meth)acrylate acid esters whose homopolymer have a glass transition temperature ($T_g$) of $-20°$ C. or lower, based on the weight of Components (a)-(e). In another embodiment, Tg of the acrylic acid ester or (meth)acrylate acid ester homopolymer is between about $-100°$ C. and $10°$ C., or between about $-70°$ C. to $10°$ C., or between about $-70°$ C. to $-10°$ C.

Examples of hydroxyl functional (meth)acrylic monomer, Component (b) include $C_1$-$C_{17}$ hydroxy functional alkyl acrylates or alkyl methacrylates. Typical examples include hydroxyethyl acrylate, hydroxyethyl methacrylate, hydroxypropyl acrylate, hydroxypropyl methacrylate, hydroxybutylacrylate, hydroxybutyl(meth)acrylate, hydroxyhexyl acrylate, hydroxyhexyl methacrylate, hydroxyethylhexyl acrylate, hydroxyethylhexyl methacrylate, and any combination or subset thereof. Other examples of hydroxyl functional (meth)acrylate monomers include acrylic esters prepared from glycidyl esters of $C_2$-$C_{12}$ carboxylic acids, for example ACE™ hydroxyl acrylate monomers commercially available from Hexion Inc.

The monomer mixture for the PSA composition of the invention may comprise about 0.1 to about 5 wt % or 0.5 to about 3 wt % hydroxyl functional (meth)acrylic monomer include, based on the weight of Components (a)-(e).

Examples of ureido substituted (meth)acrylate monomers, Component (c), include $C_7$-$C_{17}$, preferably $C_8$-$C_{17}$ ureido alkyl acrylates or alky methacrylates. Typical examples include:

2-(2-oxoimidazolidin-1-yl)ethyl 2-methylprop-2-enoate;
2-(1-methyl-2-oxoimidazolidin-1-ium-1-yl)ethyl 2-methylprop-2-enoate;
dimethyl-[2-(2-methylprop-2-enoyloxy)ethyl]-[2-(2-oxoimidazolidin-1-yl)ethyl]azanium;
dimethyl-[2-(2-methylprop-2-enoyloxy)ethyl]-[2-(2-oxoimidazolidin-1-yl)ethyl]azanium chloride;
dimethyl-[2-(2-methylprop-2-enoyloxy)ethyl]-[1-(2-oxoimidazolidin-1-yl)ethyl]azanium;
dimethyl-[2-(2-methylprop-2-enoyloxy)ethyl]-[1-(2-oxoimidazolidin-1-yl)ethyl]azanium chloride;
2-(4-methyl-2-oxoimidazolidin-1-yl)ethyl 2-methylprop-2-enoate;
1-(2-oxoimidazolidin-1-yl)ethyl 2-methylprop-2-enoate;
2-(2-oxoimidazolidin-1-yl)ethyl 2-methylidenebutanoate;
[1-acetamido-2-(2-oxoimidazolidin-1-yl)ethyl] 2-methylprop-2-enoate;
[2-oxo-2-[2-(2-oxoimidazolidin-1-yl)ethylamino]ethyl] 2-methylprop-2-enoate;
2-(3-methyl-2-oxoimidazolidin-1-yl)ethyl 2-methylprop-2-enoate;
[2-oxo-2-[2-(2-oxoimidazolidin-1-yl)ethoxy]ethyl] 2-methylprop-2-enoate;
[2-oxo-2-[1-(2-oxoimidazolidin-1-yl)ethylamino]ethyl] 2-methylprop-2-enoate; and the like, including any combination or subset thereof.

The monomer mixture for the PSA composition of the invention may comprise about 0.05 to about 3 wt % or 0.1 to 1 wt % or 0.05 to 0.9 wt % ureido substituted (meth)acrylate monomer, based on the weight of Components (a)-(e).

When utilized, examples of the optional hydrocarbon monomers, Component (d), suitable for use in the present invention include styrene compounds (e.g., styrene, carboxylated styrene, and alpha-methyl styrene), ethylene, propylene, butylene, and conjugated dienes (e.g., butadiene, isoprene and copolymers of butadiene and isoprene) and any combination or subset thereof.

When utilized, the monomer mixture for the PSA composition of the invention may comprise about 5 to about 10 wt % hydrocarbon monomers, based on the weight of Components (a)-(e).

When utilized, examples of the optional ethylenically unsaturated carboxylic acid(s), Component (e), include monoethylenically unsaturated monocarboxylic acids such as acrylic acid, methacrylic acid, ethacrylic acid, crotonic acid, and carboxyethyl acrylate, monoethylenically unsaturated dicarboxylic acids such as maleic acid, fumaric acid, itaconic acid, and citraconic acid, monoethylenically unsaturated tricarboxylic acids such as aconitic acid, and the halogen substituted derivatives (e.g., alphachloracylic acid) and anhydrides of these acids (e.g., maleic anhydride and citraconic anhydride). Alternatively, the monomer mixture is free of ethylenically unsaturated carboxylic acids.

When utilized, the monomer mixture for the PSA composition of the invention may comprise about 0.5 to about 3 wt % monoethylenically unsaturated carboxylic acids, based on the weight of Components (a)-(e).

In addition to the above, in another embodiment, the monomer mixture for the PSA compositions of the invention may optionally include further monomers which are different from Components (a)-(e). Examples of further monomers include nitriles of the above ethylenically unsaturated carboxylic acids such as acrylonitrile, alpha chloroacrylonitrile, and methacrylonitrile. Examples include amides of these carboxylic acids such as unsubstituted amides (e.g., (meth)acrylamide) and other alpha substituted acrylamides and n-substituted amides obtained by the reaction of the amides of the aforementioned carboxylic acids with an aldehyde (e.g., formaldehyde). Typical n-substituted amides include n-methylolacrylamide, n-methylolmethacrylamide alkylated n-methylolacrylamides, and n-methylolmethacrylamides (e.g., n-methyoxymethylacrylamide and n-methoxymethylmethacrylamide). When present, the monomer mixture for the PSA composition of the invention may comprise about 0.5 to about 5 wt % nitriles and/or amides of monoethylenically unsaturated carboxylic acids, based on the weight of Components (a)-(e).

Examples of further monomers include vinyl esters of carboxylic acids such as a vinyl ester of a $C_2$-$C_{12}$ carboxylic acid, for example VeoVa™ 9 vinyl ester, or VeoVa™ 10 vinyl ester, both commercially available from Hexion Inc. When present, the PSA composition of the invention may comprise about 0.5 to about 6 wt % vinyl ester of a carboxylic acid, based on the weight of Components (a)-(e).

In another embodiment of the invention, the process to prepare the dispersions of the invention may utilize a continuous phase (usually water), and may include other components standard and known in the art such as initiators, reducing agents, surfactants, defoamers wetting agents, crosslinking agents, preservatives and the like. For example, any conventional water soluble polymerization initiator suitable for emulsion polymerization may be used. The typical wt % of said initiators are from 0.01% to 2.0 wt. % and preferably 0.01 to about 1.0 wt % based on the total weight of monomers. Examples of initiators include, but are not limited to, persulfates, peroxides, azo compounds, and the mixtures thereof. The water soluable initiators can be used alone or in combination with one or more conventional reducing agents such as, but not limited to, sodium formaldehyde sulfoxylate, sodium metabisulfite, ascorbic acid, ferrous salts, chelated iron salts, and the like.

In one embodiment, the water soluable polymerization intiator systems are peroxides utilized in combination with conventional reducing agents such as tert-butyl hydroperoxide sodium formaldehyde sulfoxylate based systems with a chelated ferric complex catalyst.

Examples of suitable surfactant systems are those known in the art and include anionic, nonionic, cationic, or amphoteric emulsifiers and mixtures thereof. Examples of anionic surfactants include, but are not limited to, alkyl sulfates, sulfates of ethoxylate alcohols, aryl sulfonates, phosphates of ethoxylated alcohols, sulfosuccinates, sulfates and sulfonates of ethoxylated alkylphenols, and mixtures thereof. Examples of nonionic surfactants include, but are not limited to, ethoxylated alcohols, ethoxylated alkylphenols, and mixtures thereof. Examples of cationic surfactants include, but are not limited to, ethoxylated fatty amines. In one embodiment, reactive surfactant chemistry which have reactive carbon-carbon double bond is utilized. Examples of reactive chemistries include, but are not limited to, alkylphenol ethoxylates containing alkenyl substituents, polyoxyalkylene-1-(allyloxymethyl) alkyl ether sulfate salt compounds, salts of poly(oxy-1,2-ethanediyl), alpha-sulfo-omega-[1-(hydroxymethyl)-2-(2-propenyloxy)ethoxy] (Adeka SR Series, commercially available from Adeka Corporation), and mixtures or subsets thereof. In one embodiment, the reactive surfactant includes an Adeka SR Series reactive surfactant. The typical weight of surfactant is 0.2 to 5.0 wt. % and more preferably 1.0 to 5.0 wt. % and most preferably 1.0 to 3.0 wt. %. The surfactants are utilized by conventional methods that are well known in art. In one embodiment, the process to prepare the PSA includes the emulsification of the monomer mix with the surfactant system prior to the polymerization reaction.

Following polymerization, the pH of the latex emulsion is adjusted with a suitable base including, but are not limited to, metal hydroxides, ammonium hydroxide, amines, and mixtures thereof. The pH is adjusted to at least 6.0, and more preferably 6.5 to 9.5, and most preferably 7.0 to 9.0. In one embodiment, the suitable base is ammonium hydroxide.

The PSA emulsion of the invention has a typical solids content from about 30 to 70% and preferably 40 to 55%. Polymerization can be conducted at typical temperatures for emulsion polymerization. The polymerization is preferably conducted in the range of 110° F. (43.3° C.) to 210° F. (99° C.) and more preferably 130° F. (54° C.) to 190° F. (88° C.).

The PSA compositions according to the present invention may comprise further additives to adjust the required properties of the PSA compositions. For example tackifiers and or polyolefin emulsions may be added to improve the adhesion properties on certain substrates such as stainless steel and high density polyethylene. Tackifiers and polyolefin emulsions may be added in amounts of 1 to 60 wt %, preferably 5 to 40 wt %, most preferred 10-25 wt % solids based on total solids of the PSA composition.

Suitable tackifiers may be selected from rosin acid, rosin ester, terpene, or hydrocarbon based tackifiers. Commercially available examples are Aquatac 6085 from Arizona Chemical, Snowtack FH95G from Lawter Inc, Tacolyn 1070 from Eastman Chemical Company, and Dermulsene TR501 from DRT.

Suitable polyolefin emulsions may be selected from polyethylene or polypropylene dispersions. The polyolefin may contain acid functionality. Commercially available examples are Cohesa 0001 from Honeywell, Michem Prime 4990R from Michelman, and Hypod 4501 from The Dow Chemical Company.

In order to provide a better understanding of the present invention including representative advantages thereof, the following examples are offered.

EXAMPLES

Example 1 (Comparative)

A pre-emulsion was formed by mixing 231.3 g water, 25.4 g Dowfax 2A1 (from Dow), 4.6 g Abex 2535 (from Solvay), 380.4 g 2-ethylhexyl acrylate, 270.1 g n-butyl acrylate, 72.3 g methyl methacrylate, 22.8 g styrene, and 15.2 g 2-hydroxyethyl acrylate. Two separate solutions were prepared: (A) 2.3 g sodium persulfate in 54.8 g water and (B) 1.5 g sodium persulfate in 13.7 g water. 349 g water and 1.0 g Dowfax 2A1 surfactant were charged to the reactor. Nitrogen purge was started and heating to 78° C. took place. At 78° C., 31 g of the pre-emulsion was added to the reactor. Solution B was charged to the kettle and flushed with 3 g water. Nitrogen purge was turned off, and the reaction exotherm began. 15 minutes after the exotherm peaked, the mixture from pre-emulsion tank and solution A were allowed to flow into the reactor for 3.5 hours and the reactor temperature was controlled at 85° C. After the flow was complete, the pre-emulsion was flushed with 8 g water and the reactor held at 87° C. for 45 minutes then cooled. Solution (C) 2.7 g t-butyl hydroperoxide in 20 g water and (D) 1.2 g sodium formaldehyde sulfoxylate in 16 g water were prepared. Flow of solution C and D to reactor over 45 minutes was started, and the reactor held for another 15 minutes. The reactor was cooled to room temperature and the pH was adjusted to 6.0-8.0 with 28% aqueous ammonia solution. 1% Aerosol OT-75 (from Cytec) based on the total weight was added and mixed for 1 hours.

Examples 2 to 9 were prepared using the same method of Example 1 with different monomer compositions as set forth in Table 1.

The samples were tested by coating onto 2-mil PET film, air drying at room temperature for 30 minutes and drying in a 110° C. oven for 3 minutes with a target dried adhesive coat weight of 50 g/m2. The coated PET was laminated to release liner. The PET/adhesive/liner construction was cut into 1-inch wide stripes, the release liner was removed, and the PET film with adhesive was laminated to stainless steel (SS) for peel testing based on the method PSTC-101 with 15-minute and 24-hour dwell time. After adhering to the test panel, it was rolled twice by 2 kg weight roller. 180 degree peel was run at the specified dwell time with an Instron tester. The sample strips were also tested for SAFT (Shear Adhesion Failure Temperature) using the method PSTC-17 Both PSTC methods are from Pressure Sensitive Tape Council (USA). 1 inch wide strip with length of 6 inch was cut and reinforced with aluminum foil tape on the back side to avoid tearing at high temperature. It was adhered to stainless steel panel with 1 inch by 1 inch contact area and then rolled twice by 2-kg weight roller. The steel panel with the strip was held in a rack in a 40° C. oven such that the panel forms an angle of 178° to 180°. As soon as the steel panel with adhesive strip was put in the oven, it dwelled in the oven for 30 minutes. Then the 1-kg weight was hanged on the strips. The oven was programmed to hold at 40° C. for 20 minutes immediately after the weight is hanged. After the 20 minutes hold, the oven temperature increased at a rate of 0.5° C. per minute. When the oven temperature reached 200° C., the test was completed and the oven started to cool. When the 1-kg weight dropped due to the failure of test strips on steel panel, the temperature is recorded as SAFT. If test strip did not fail throughout the course of temperature rise, the SAFT is recorded as 200+° C.

The results are set forth in Table 2.

TABLE 1

|       | ex 1 (comp) | ex 2 (comp) | ex 3 | ex 4 (comp) | ex 5 | ex 6 | ex 7 | ex 8 | ex 9 |
|-------|-------------|-------------|------|-------------|------|------|------|------|------|
| 2-EHA | 50          | 50          | 50   | 50          | 50   | 50   | 50   | 50   | 50   |
| BA    | 35.5        | 35.5        | 35.5 | 37.6        | 35.5 | 35.5 | 35.5 | 35.5 | 35.5 |
| MMA   | 9.5         | 8           | 9.25 | 7           | 9    | 10   | 9    | 7.75 | 9    |

TABLE 1-continued

| | ex 1 (comp) | ex 2 (comp) | ex 3 | ex 4 (comp) | ex 5 | ex 6 | ex 7 | ex 8 | ex 9 |
|---|---|---|---|---|---|---|---|---|---|
| ST | 3 | 3 | 3 | 3 | 3 | 3 | 3 | 3 | 3 |
| AA | 0 | 1.5 | 0 | 2 | 0 | 0 | 0 | 1.5 | 0 |
| HPA | | | | | | | 2 | | |
| HEA | 2 | 2 | 2 | | 2 | 1 | | 2 | |
| HBA | | | | | | | | | 2 |
| UM | | | 0.25 | 0.5 | 0.5 | 0.5 | 0.5 | 0.25 | 0.5 |

In Table 1, the following abbreviations are used.
2-EHA: 2-Ethylhexyl acrylate
BA: n-Butyl acrylate
MMA: Methyl methacrylate
ST: Styrene
AA: Acrylic acid
HPA: 2-Hydroxypropyl acrylate
HEA: 2-Hydroxyethyl acrylate
HBA: 4-Hydroxybutyl acrylate
UM: N-(2-Methacryloyloxyethyl) ethylene urea (same as 2-(2-oxoimidazolidin-1-yl)ethyl 2-methylprop-2-enoate)

TABLE 2

| | ex 1 (comp) | ex 2 (comp) | ex 3 | ex 4 (comp) | ex 5 | ex 6 | ex 7 | ex 8 | ex 9 |
|---|---|---|---|---|---|---|---|---|---|
| PL15 (SS) (lbs/inch) | 5.25 | 4.48 | 1.69 | 1.94 | 1.61 | 1.86 | 1.68 | 2.00 | 0.62 |
| PL24 (SS) (lbs/inch) | 4.63 | 6.70 | 2.22 | 2.56 | 1.39 | 1.92 | 1.46 | 2.67 | 1.34 |
| SAFT (° C.) | 40 | 61 | 200+ | 97.3 | 200+ | 173 | 172 | 200+ | 200+ |

Examples 10 to 12

Example 10 is a repetition of example 8. In the composition of example 11 Cohesa 0001 a polyolefin dispersion commercially available from Honeywell is added in the amounts as indicated in Table 3. In Example 12 Snowtack FH95G a rosin tackifier dispersion commercially available from Lawter is added in the amounts as indicated in Table 3. The Pl 15 peel strength results (lbs/inch) on stainless steel (SS) and high density polyethylene (HDPE) substrates are reported in Table 3.

TABLE 3

| | ex 10 | ex 11 | ex 12 |
|---|---|---|---|
| ex 8 (52% solids) | 100 | 100 | 100 |
| Cohesa 0001 (47% solids) | | 10 | |
| Snowtack FH95G (57% solids) | | | 10 |
| Aerosol OT-75 | 1 | 1 | 1 |
| PL15 (SS) | 2.19 | 3.04 | 3.02 |
| PL15 (HDPE) | 0.72 | 1.56 | 1.43 |

I claim:

1. A pressure sensitive adhesive composition comprising: one or more polyolefin emulsions; and
an emulsion polymerization product of a monomer mixture, the monomer mixture comprising:
(a) equal to or greater than about 50 wt % of one or more acrylic acid ester or (meth)acrylate acid ester(s);
(b) about 0.1 to about 5 wt % of one or more hydroxyl functional (meth)acrylic monomer(s);
(c) about 0.05 to about 3 wt % of one or more ureido substituted (meth)acrylate monomer(s);
(d) at least one vinyl ester of carboxylic acid; and
(e) wherein no ethylenically unsaturated carboxylic acid is present in the monomer mixture;
wherein the wt % is based on the total weight of the monomer mixture.

2. The pressure sensitive adhesive composition of claim 1, wherein:
(a) the one or more acrylic acid esters or methacrylate acid esters comprises a $C_1$-$C_{17}$ alkyl acrylates or alkyl methacrylates;
(b) the one or more hydroxyl functional (meth)acrylic monomer comprises a $C_1$-$C_{17}$ hydroxy functional alkyl acrylates or alkyl methacrylates, or comprises one or more acrylic esters prepared from a glycidyl ester of $C_2$-$C_{12}$ carboxylic acid; and
(c) the one or more ureido substituted (meth)acrylate monomers comprises $C_7$-$C_{17}$ ureido alkyl acrylates or alky methacrylates.

3. The pressure sensitive adhesive composition of claim 2, wherein:
(b) the one or more hydroxyl functional (meth)acrylic monomer is selected from the group consisting of hydroxyethyl acrylate, hydroxyethyl methacrylate, hydroxypropyl acrylate, hydroxypropyl methacrylate, hydroxybutylacrylate, hydroxybutyl(meth)acrylate, hydroxyhexyl acrylate, hydroxylhexyl methacrylate, hydroxyethylhexyl acrylate, hydroxyethylhexyl methacrylate and combinations thereof.

4. The pressure sensitive adhesive composition of claim 3, wherein:
(c) the one or more ureido substituted (meth)acrylate monomers is selected from the group consisting of 2-(2-oxoimidazolidin-1-yl)ethyl 2-methylprop-2-enoate;
2-(1-methyl-2-oxoimidazolidin-1-ium-1-yl)ethyl 2-methylprop-2-enoate;
dimethyl-[2-(2-methylprop-2-enoyloxy)ethyl]-[2-(2-oxoimidazolidin-1-yl)ethyl]azanium;
dimethyl-[2-(2-methylprop-2-enoyloxy)ethyl]-[2-(2-oxoimidazolidin-1-yl)ethyl]azanium chloride;
dimethyl-[2-(2-methylprop-2-enoyloxy)ethyl]-[1-(2-oxoimidazolidin-1-yl)ethyl]azanium;

dimethyl-[2-(2-methylprop-2-enoyloxy)ethyl]-[1-(2-oxo-imidazolidin-1-yl)ethyl]azanium chloride;
2-(4-methyl-2-oxoimidazolidin-1-yl)ethyl 2-methylprop-2-enoate;
1-(2-oxoimidazolidin-1-yl)ethyl 2-methylprop-2-enoate;
2-(2-oxoimidazolidin-1-yl)ethyl 2-methylidenebutanoate;
[1-acetamido-2-(2-oxoimidazolidin-1-yl)ethyl] 2-methylprop-2-enoate;
[2-oxo-2-[2-(2-oxoimidazolidin-1-yl)ethylamino]ethyl] 2-methylprop-2-enoate;
2-(3-methyl-2-oxoimidazolidin-1-yl)ethyl 2-methylprop-2-enoate;
[2-oxo-2-[2-(2-oxoimidazolidin-1-yl)ethoxy] ethyl] 2-methylprop-2-enoate;
[2-oxo-2-[1-(2-oxoimidazolidin-1-yl)ethylamino]ethyl] 2-methylprop-2-enoate, and combinations thereof.

5. The pressure sensitive adhesive composition of claim 4, further comprising: (f) one or more hydrocarbon monomer(s) present in an amount of 0 to about 3 wt % or about 5 to about 10 wt % based on the total weight of the monomer mixture, wherein the one or more hydrocarbon monomer(s) is selected from the group consisting of styrene compounds, ethylene, propylene, butylene, conjugated dienes and combinations thereof.

6. The pressure sensitive adhesive composition of claim 5, wherein the one or more ureido substituted (meth)acrylate monomer(s) (c) are present in an amount of 0.05 to 0.9 wt % based on the total weight of the monomer mixture.

7. The pressure sensitive adhesive composition of claim 6, further comprising tackifiers.

8. The pressure sensitive adhesive composition of claim 1, wherein:
(b) the one or more hydroxyl functional (meth)acrylic monomer is selected from the group consisting of hydroxyethyl acrylate, hydroxyethyl methacrylate, hydroxypropyl acrylate, hydroxypropyl methacrylate, hydroxybutylacrylate, hydroxybutyl(meth)acrylate, hydroxyhexyl acrylate, hydroxylhexyl methacrylate, hydroxyethylhexyl acrylate, hydroxyethylhexyl methacrylate and combinations thereof.

9. The pressure sensitive adhesive composition of claim 1, wherein:
(c) the one or more ureido substituted (meth)acrylate monomers is selected from the group consisting of 2-(2-oxoimidazolidin-1-yl)ethyl 2-methylprop-2-enoate;
2-(1-methyl-2-oxoimidazolidin-1-ium-1-yl)ethyl 2-methylprop-2-enoate;
dimethyl-[2-(2-methylprop-2-enoyloxy)ethyl]-[2-(2-oxo-imidazolidin-1-yl)ethyl]azanium;
dimethyl-[2-(2-methylprop-2-enoyloxy)ethyl]-[2-(2-oxo-imidazolidin-1-yl)ethyl]azanium chloride;
dimethyl-[2-(2-methylprop-2-enoyloxy)ethyl]-[1-(2-oxo-imidazolidin-1-yl)ethyl]azanium;
dimethyl-[2-(2-methylprop-2-enoyloxy)ethyl]-[1-(2-oxo-imidazolidin-1-yl)ethyl]azanium chloride;
2-(4-methyl-2-oxoimidazolidin-1-yl)ethyl 2-methylprop-2-enoate;
1-(2-oxoimidazolidin-1-yl)ethyl 2-methylprop-2-enoate;
2-(2-oxoimidazolidin-1-yl)ethyl 2-methylidenebutanoate;
[1-acetamido-2-(2-oxoimidazolidin-1-yl)ethyl] 2-methylprop-2-enoate;
[2-oxo-2-[2-(2-oxoimidazolidin-1-yl)ethylamino]ethyl] 2-methylprop-2-enoate;
2-(3-methyl-2-oxoimidazolidin-1-yl)ethyl 2-methylprop-2-enoate;
[2-oxo-2-[2-(2-oxoimidazolidin-1-yl)ethoxy] ethyl] 2-methylprop-2-enoate;
[2-oxo-2-[1-(2-oxoimidazolidin-1-yl)ethylamino]ethyl] 2-methylprop-2-enoate, and combinations thereof.

10. The pressure sensitive adhesive composition of claim 1, wherein the one or more ureido substituted (meth)acrylate monomer(s) (c) are present in an amount of 0.05 to 0.9 wt % based on the total weight of the monomer mixture.

11. The pressure sensitive adhesive composition of claim 1, further comprising tackifiers.

12. The pressure sensitive adhesive of claim 1, further comprising:
(f) 0 to about 10 wt % of one or more hydrocarbon monomer(s).

13. The pressure sensitive adhesive composition of claim 12, wherein:
(f) the one or more hydrocarbon monomer(s) is present in an amount of 0 to about 3 wt % or about 5 to about 10 wt % based on the total weight of the monomer mixture, and is selected from the group consisting of styrene compounds, ethylene, propylene, butylene, conjugated dienes and combinations thereof.

14. The pressure sensitive adhesive composition of claim 1, wherein the monomer mixture comprises about 0.5 to about 6 wt % of the at least one vinyl ester of carboxylic acid.

15. A pressure sensitive adhesive composition comprising:
one or more polyolefin emulsions; and
an emulsion polymerization product of a monomer mixture, the monomer mixture comprising:
(a) equal to or greater than about 50 wt % of one or more acrylic acid ester or (meth)acrylate acid ester(s);
(b) about 0.1 to about 5 wt % of one or more hydroxyl functional (meth)acrylic monomer(s);
(c) about 0.05 to about 0.5 wt % of one or more ureido substituted (meth)acrylate monomer(s), wherein the one or more ureido substituted (meth)acrylate monomers is selected from the group consisting of:
2-(2-oxoimidazolidin-1-yl)ethyl 2-methylprop-2-enoate;
2-(1-methyl-2-oxoimidazolidin-1-ium-1-yl)ethyl 2-methylprop-2-enoate;
dimethyl-[2-(2-methylprop-2-enoyloxy)ethyl]-[2-(2-oxoimidazolidin-1-yl)ethyl]azanium;
dimethyl-[2-(2-methylprop-2-enoyloxy)ethyl]-[2-(2-oxoimidazolidin-1-yl)ethyl]azanium chloride;
dimethyl-[2-(2-methylprop-2-enoyloxy)ethyl]-[1-(2-oxoimidazolidin-1-yl)ethyl]azanium;
dimethyl-[2-(2-methylprop-2-enoyloxy)ethyl]-[1-(2-oxoimidazolidin-1-yl)ethyl]azanium chloride;
2-(4-methyl-2-oxoimidazolidin-1-yl)ethyl 2-methylprop-2-enoate;
1-(2-oxoimidazolidin-1-yl)ethyl 2-methylprop-2-enoate;
2-(2-oxoimidazolidin-1-yl)ethyl 2-methylidenebutanoate;
[1-acetamido-2-(2-oxoimidazolidin-1-yl)ethyl] 2-methylprop-2-enoate;
[2-oxo-2-[2-(2-oxoimidazolidin-1-yl)ethylamino] ethyl] 2-methylprop-2-enoate;
2-(3-methyl-2-oxoimidazolidin-1-yl)ethyl 2-methylprop-2-enoate;
[2-oxo-2-[2-(2-oxoimidazolidin-1-yl)ethoxy] ethyl] 2-methylprop-2-enoate;

[2-oxo-2-[1-(2-oxoimidazolidin-1-yl)ethylamino]
ethyl] 2-methylprop-2-enoate, and combinations thereof;
(d) at least one vinyl ester of carboxylic acid;
(e) wherein no ethylenically unsaturated carboxylic acid is present in the monomer mixture; and
(f) one or more hydrocarbon monomer(s) in an amount of 0 to about 3 wt % or about 5 to about 10 wt %, wherein the one or more hydrocarbon monomer(s) is selected from the group consisting of styrene compounds, ethylene, propylene, butylene, conjugated dienes and combinations thereof;
wherein the wt % is based on the total weight of the monomer mixture.

16. The pressure sensitive adhesive composition of claim 15, further comprising tackifiers.

* * * * *

UNITED STATES PATENT AND TRADEMARK OFFICE
CERTIFICATE OF CORRECTION

| | |
|---|---|
| PATENT NO. | : 11,345,832 B2 |
| APPLICATION NO. | : 15/749864 |
| DATED | : May 31, 2022 |
| INVENTOR(S) | : Jong S. Guo |

It is certified that error appears in the above-identified patent and that said Letters Patent is hereby corrected as shown below:

In the Claims

Column 10, Line 11, Claim 12, after "adhesive" insert -- composition --

Signed and Sealed this
Fifth Day of March, 2024

Katherine Kelly Vidal
*Director of the United States Patent and Trademark Office*